(12) United States Patent
Redbrandt et al.

(10) Patent No.: US 8,936,530 B2
(45) Date of Patent: Jan. 20, 2015

(54) METHOD AND SYSTEM PERTAINING TO DETERMINATION OF A CONTACT POINT FOR A CLUTCH

(75) Inventors: Karl Redbrandt, Solna (SE); Andreas Laghamn, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/001,786

(22) PCT Filed: Mar. 12, 2012

(86) PCT No.: PCT/SE2012/050274
§ 371 (c)(1),
(2), (4) Date: Aug. 27, 2013

(87) PCT Pub. No.: WO2012/125112
PCT Pub. Date: Sep. 20, 2012

(65) Prior Publication Data
US 2013/0331231 A1  Dec. 12, 2013

(30) Foreign Application Priority Data

Mar. 14, 2011 (SE) ...................................... 1150218

(51) Int. Cl.
*B60W 10/00* (2006.01)
*F16D 48/06* (2006.01)
(Continued)

(52) U.S. Cl.
CPC ............... *B60W 10/02* (2013.01); *F16D 48/06* (2013.01); *F16D 2500/50251* (2013.01); *F16D 2500/3067* (2013.01); *F16D 2500/3108* (2013.01); *B60W 2510/0638* (2013.01); *B60W 2050/0087* (2013.01); *B60W 10/11* (2013.01); *B60W 10/06* (2013.01)
USPC .......................................................... 477/78

(58) Field of Classification Search
USPC ..................................................... 477/78, 174
See application file for complete search history.

(56) References Cited

U.S. PATENT DOCUMENTS 5,624,350 A * 4/1997 Bates ............................. 477/78
5,993,355 A * 11/1999 Nordgård ...................... 477/174
(Continued)

FOREIGN PATENT DOCUMENTS

EP 0 635 391 A2 1/1995
EP 1 741 950 A1 1/2007
(Continued)

OTHER PUBLICATIONS

International Search Report dated Apr. 18, 2012 issued in corresponding International patent application No. PCT/SE2012/050274.
(Continued)

*Primary Examiner* — Dirk Wright
(74) *Attorney, Agent, or Firm* — Ostrolenk Faber LLP (57) ABSTRACT

A method concerning determining of a contact point for a clutch (106) of a vehicle (100), such that the clutch (106) to transmit driving power between a first power source in the form of an engine (101) and at least one powered wheel (113, 114), by opening of the clutch (106), and when the contact point is being determined and the vehicle (100) is in motion controlling the speed of the first power source (101) towards a first speed (ω1) which is higher than an idling speed of the first power source (101).

14 Claims, 3 Drawing Sheets

(51) Int. Cl.
*B60W 10/02* (2006.01)
*B60W 10/06* (2006.01)
*B60W 50/00* (2006.01)
*B60W 10/11* (2012.01)

(56) References Cited

U.S. PATENT DOCUMENTS

| | | | |
|---|---|---|---|
| 6,023,988 A * | 2/2000 | McKee et al. | 74/336 R |
| 6,086,514 A * | 7/2000 | Jones et al. | 477/180 |
| 6,309,325 B1 * | 10/2001 | Baer et al. | 477/174 |
| 6,494,810 B1 * | 12/2002 | Mack et al. | 477/174 |
| 6,840,890 B2 * | 1/2005 | Mack et al. | 477/174 |
| 7,850,570 B2 | 12/2010 | Jäger et al. | |
| 8,577,570 B2 * | 11/2013 | Ellis | 701/67 |
| 8,583,334 B2 * | 11/2013 | Martin et al. | 701/51 |
| 8,712,658 B2 * | 4/2014 | Holzer et al. | 701/68 |
| 8,738,256 B2 * | 5/2014 | Connolly et al. | 701/68 |
| 2013/0345940 A1 * | 12/2013 | Redbrandt et al. | 701/53 |

FOREIGN PATENT DOCUMENTS

| | | |
|---|---|---|
| EP | 1 840 401 A1 | 10/2007 |
| WO | WO 2004/048796 A2 | 6/2004 |
| WO | WO 2008 028817 A1 | 3/2008 |

OTHER PUBLICATIONS

Office Action issued by Korean Patent Office on 07/240/14 in connection with corresponding.
Korean Patent Application No. 10-2013-7027100 with Japanese and English Translation thereof.

* cited by examiner

FIG. 1a

Fig. 1b

METHOD AND SYSTEM PERTAINING TO DETERMINATION OF A CONTACT POINT FOR A CLUTCH

CROSS-REFERENCE TO RELATED APPLICATIONS

The present application is a 35 U.S.C. §§371 national phase conversion of PCT/SE2012/050274, filed Mar. 12, 2012, which claims priority of Swedish Patent Application No. 1150218-4, filed Mar. 14, 2011, the contents of which are incorporated by reference herein. The PCT International Application was published in the English language.

FIELD OF THE INVENTION

The present invention relates to vehicles with an automatically controlled clutch and in particular to a method and a system pertaining to determination of a contact point for a clutch. The invention relates also to a vehicle according to claim 14.

BACKGROUND OF THE INVENTION

In vehicles in general, various different power train configurations occur, e.g. the gearbox may take the form of a manually operated gearbox or an automatic gearbox. In the case of heavy vehicles, it is often desirable for them to be drivable in as comfortable a way for the driver as possible, which usually entails the gear changes in the gearbox being effected automatically by means of the vehicle's control system. Gearboxes which change gear automatically have therefore also become increasingly usual in heavy vehicles.

This automatic gear changing is often effected in heavy vehicles by control system control of gear changes in "manual" gearboxes (also called AMT, automated manual transmission), partly because they are substantially less expensive to make, but also because of their greater efficiency.

The efficiency of automatic gearboxes of the type often provided in cars is far too low to be justified other than in, for example, urban buses and distribution vehicles which have frequently to come to a halt and then move off again.

"Manual" gearboxes which change gear automatically are therefore usual in heavy vehicles largely used on motorways/national highways.

This gear changing may be effected in various different ways, one of which involves using an automatically controlled clutch for up/downshifts, in which case the driver only needs access to an accelerator pedal and a brake pedal.

In principle, the clutch need only be used to set the vehicle in motion from stationary, as other gear changes can be effected by the vehicle's control system without using the clutch at all, since they are instead effected "torque-free". It is also possible for the automatically controlled clutch to be used for only certain gear steps or only in upshifts or downshifts.

For comfort reasons, however, the automatically controlled clutch is in many cases used in all or substantially all upshifts and downshifts. On vehicles with automatic clutches, it is important to know the clutch's contact point (traction position), i.e. the position at which the clutch begins to transmit torque.

By knowing the contact point when for example the vehicle is moving off, coming to a halt and changing gear thus provides its control system with knowledge of the clutch position at which torque transfer from the engine to the rest of the power train begins or ends. This means that setting the vehicle in motion and changing gear can be effected in such a way as not to cause unacceptable jerking or unacceptable wear in the power train.

The contact point is however not a fixed position but may vary, e.g. because the clutch wears. It may also change when the vehicle is in motion, which means that even if it is determined at the beginning of a journey there is no certainty that the actual contact point later in the journey will correspond to that determined at the beginning.

There may thus be a need to effect contact point determination during a journey. Opportunities for doing so without disturbing the vehicle's driver may be more or less available depending on the environment on which the vehicle is travelling.

A problem with contact point determination is that the time it takes may be too long for it to take place unnoticed when the vehicle is in motion.

If the vehicle is for example travelling in urban traffic with many starts and stops, there may be good opportunities for doing contact point determination, e.g. when stationary at a red light. In the case, however, of vehicles mainly used on national highways, the number of possible opportunities may be significantly more limited. This is because the gearbox needs to be in neutral position for contact point adaptation to be possible. When the vehicle is travelling on national highways, there may be very long periods between any gear changes, particularly in low-lying areas. Contact point adaptation is therefore problematical in situations which involve no gear changes.

There is thus a need for an improved method for determining the contact point when the vehicle is in motion.

SUMMARY OF THE INVENTION

An object of the present invention is to propose a method pertaining to determination of a contact point for a vehicle which makes its determination during a journey possible without disturbing the vehicle's driver.

The present invention relates to a method pertaining to determination of a contact point for a clutch of a vehicle, where said clutch is intended to transmit driving power between a first power source in the form of an engine, e.g. a combustion engine, and at least one powered wheel, said contact point determination involves opening of said clutch and the method further comprises during determination of the contact point, when the vehicle is in motion, controlling the rotation speed of said first power source towards a first speed which exceeds an idling speed of said first power source.

This affords the advantage that the clutch's contact point, i.e. the clutch position at which contact occurs between engine and gearbox, can be determined on more occasions than has previously been possible, without unacceptably disturbing the vehicle's driver. This is made possible by engine control such that during contact point determination the engine is not allowed to drop to idling speed but can, for example, be controlled as if the power train is still closed. Thus the power source may be controlled so that contact point determination can take place substantially unnoticed by the vehicle's driver.

Contact point determination may thus begin in situations where the power train is closed, i.e. the clutch is closed and a gear is engaged in the gearbox and the vehicle is travelling with said first power source running at a speed which exceeds an idling speed, resulting in substantially more opportunities for doing contact point determination while the vehicle is in motion. For example, long-distance haulage vehicles can in principle travel all day without stopping, which means that the contact point might change markedly during the journey with no opportunities while the vehicle is in motion for correcting the contact point without disturbing the driver. Such problems are therefore solved according to the present invention.

Further characteristics of the present invention and advantages thereof are indicated by the detailed description of embodiments set out below and the attached drawings.

DETAILED DESCRIPTION OF EMBODIMENTS

Figure 1A:
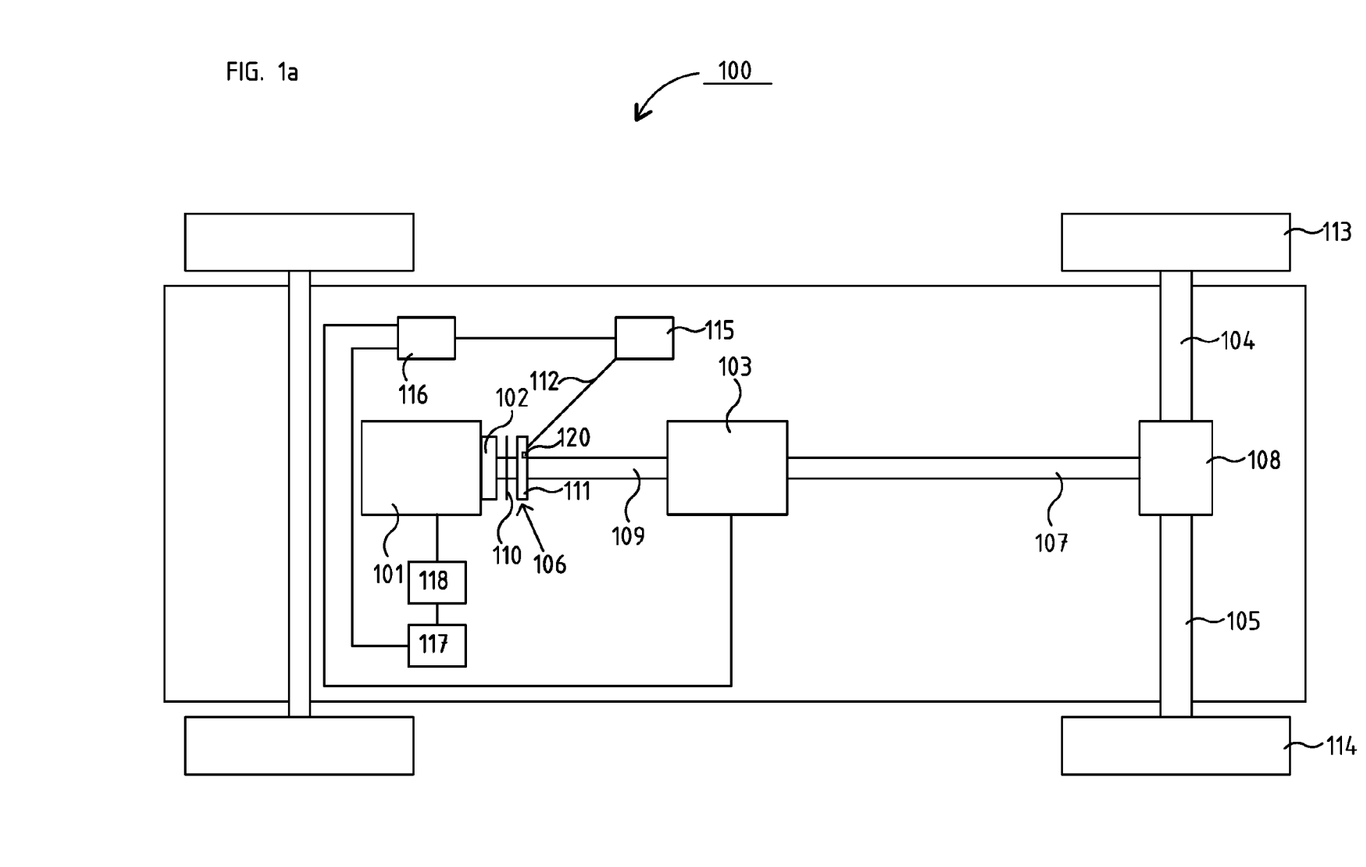
FIG. 1a depicts a power train of a vehicle in which the present invention may be used.

FIG. 1a depicts a power train of a vehicle 100 according to an embodiment of the present invention. The vehicle 100 schematically depicted in FIG. 1 has only one axle provided with powered wheels 113, 114 but the invention is also applicable on vehicles in which more than one axle is provided with powered wheels. The power train comprises a first power source in the form of a combustion engine 101 which in a conventional way, via an output shaft of the engine, usually via a flywheel 102, is connected to a gearbox 103 via a clutch 106.

The clutch 106 takes the form of an automatically controlled clutch and in this embodiment is of disc type whereby a friction element (disc) 110 connected to a first gearbox element, e.g. an input shaft 109 of the gearbox 103, engages selectively with the flywheel 102 to transfer driving power from the engine 101 to the powered wheels 113, 114 via the gearbox 103. The engagement of the clutch disc 110 with the engine flywheel 102 is controlled by means of a pressure plate 111 which is movable sideways, e.g. by means of a lever arm 112, the function of which is controlled by a clutch actuator 115.

The action of the clutch actuator 115 on the lever arm 112 is itself controlled by the vehicle's control system.

Control systems in modern vehicles usually comprise a communication bus system composed of one or more communication buses for connecting together a number of electronic control units (ECUs), or controllers, and various components located on the vehicle. Such a control system may comprise a large number of control units and the responsibility for a specific function may be divided between two or more control units. For the sake of simplicity, FIG. 1a shows only control units 116, 117, 118, 119, but one skilled in the art will appreciate that vehicles of the type here concerned often have significantly more control units.

Control unit 116 controls the clutch 106 (the clutch actuator 115), and in the embodiment depicted the present invention is implemented in control unit 117. Control unit 117 may be a control unit dedicated for the present invention, but the present invention may also be implemented wholly or partly in one or more other already existing control units of the vehicle 100, e.g. control unit 116 and/or control unit 118 which here controls the vehicle's engine 101, and/or control unit 119 which here controls the gearbox 103.

The control exercised by control unit 116 over the clutch actuator 115 is also likely to depend not only on control unit 117 but also on, for example, information received for example from the control unit which is responsible for the function of the gearbox 103, and information from the one or more control units which control engine functions, viz. in the present example control units 118, 119.

Control units of the type here concerned are normally arranged to receive sensor signals from various parts of the vehicle 100, e.g. control unit 116 may receive sensor signals representing the position of the clutch disc and/or of the lever arm. Control unit 117 may for example receive signals from the control unit 116 and also from, for example, the engine control unit 118 and the gearbox control unit 119. Control units of the type here concerned are also usually arranged to deliver control signals to various vehicle parts and components. In the present example, control unit 117 delivers signals, for example, to control unit 116 to demand/order control of the engine's speed as below.

Control is often governed by programmed instructions, typically in the form of a computer programme which, when executed in a computer or control unit, causes the computer/control unit to effect desired forms of control action, e.g. method steps according to the present invention. The computer programme usually takes the form of a computer programme product 129 which is stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation is therefore modifiable by altering the computer programme's instructions.

Figure 1B:
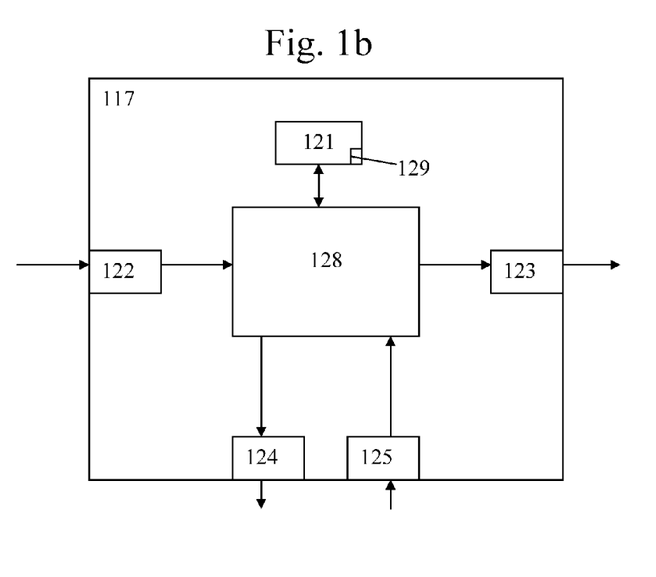
FIG. 1b depicts a control unit in a vehicle control system.

An example of a control unit (control unit 117) is depicted schematically in FIG. 1b, possibly comprising a calculation unit 128 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 128 is connected to a memory unit 121 which provides it with, for example, the stored programme code 129 and/or the stored data which the calculation unit 128 needs for it to be able to perform calculations. The calculation unit 128 is also arranged to store partial or final results of calculations in the memory unit 121.

The control unit 117 is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 128 can process. These signals are therefore conveyed to the calculation unit 128. The output signal sending devices 123, 124 are arranged to convert signals received from the calculation unit 128 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

Reverting to FIG. 1a, the vehicle 100 further comprises driveshafts 104, 105 which are connected to its powered wheels 113, 114 and are driven by an output shaft 107 of the gearbox 103 via an axle gear 108, e.g. a conventional differential. When a gear change is effected on the vehicle 100 depicted in FIG. 1a, the clutch 106 is opened by a clutch actuator 115 which is controlled by a control unit, a different gear is engaged in the gearbox and the clutch then closes. As mentioned above, in such gear changes, it is important that the vehicle's control system has good knowledge of the clutch's contact point, i.e. the physical position at which the clutch disc comes into contact with the flywheel and can therefore begin to transmit torque between the engine and the rest of the power train.

Knowledge of the position of the contact point and the characteristic of the clutch 106, which may vary from clutch to clutch and which, like the contact point, needs to be estimated at regular intervals (there will be no further description here of such estimation of the clutch characteristic), and consequent knowledge of the torque which the clutch can transmit at different positions, make it possible for gear changes to be effected in a way which is not only comfortable for the driver, e.g. in that they can take place without unacceptable jerking, but also in a sparing way which reduces unnecessary power train wear. The gear change process may also be expedited in that during it the clutch need not be opened more than is necessary to release the clutch disc from the flywheel, rather than using the full potential movement of the lever arm.

Contact point in this description and the claims set out below means not only the physical position which the clutch disc is in when it just makes physical contact with the flywheel (or with some other element connected to the engine output shaft), i.e. the point at which the clutch begins to transmit torque, but also any representation of that position, so the contact point may for example be the position of the lever arm and/or the clutch actuator at the moment when the clutch disc just makes contact with the flywheel.

A contact point determination is usually done to find out the precise position at which the clutch 106 begins to transmit torque. However, the contact point is not a fixed point but may vary, e.g. because the clutch wears over time. Although clutch wear may be regarded as negligible over a short period, the contact point might change while the vehicle is in motion, which means that even if it is determined at the beginning of a journey there is no certainty that the actual contact point later in the journey will correspond to that determined at the beginning. For example, the position of the contact point may be highly temperature-dependent and vary with clutch temperature variations during a journey.

There is thus a need to do contact point determination while a vehicle 100 is in motion. Opportunities for doing so without disturbing the driver may be more or less available depending on the environment in which the vehicle is travelling.

The present invention proposes a method for increasing the opportunities for doing contact point determination (contact point adaptation) without disturbing the vehicle's driver.

Figure 2:
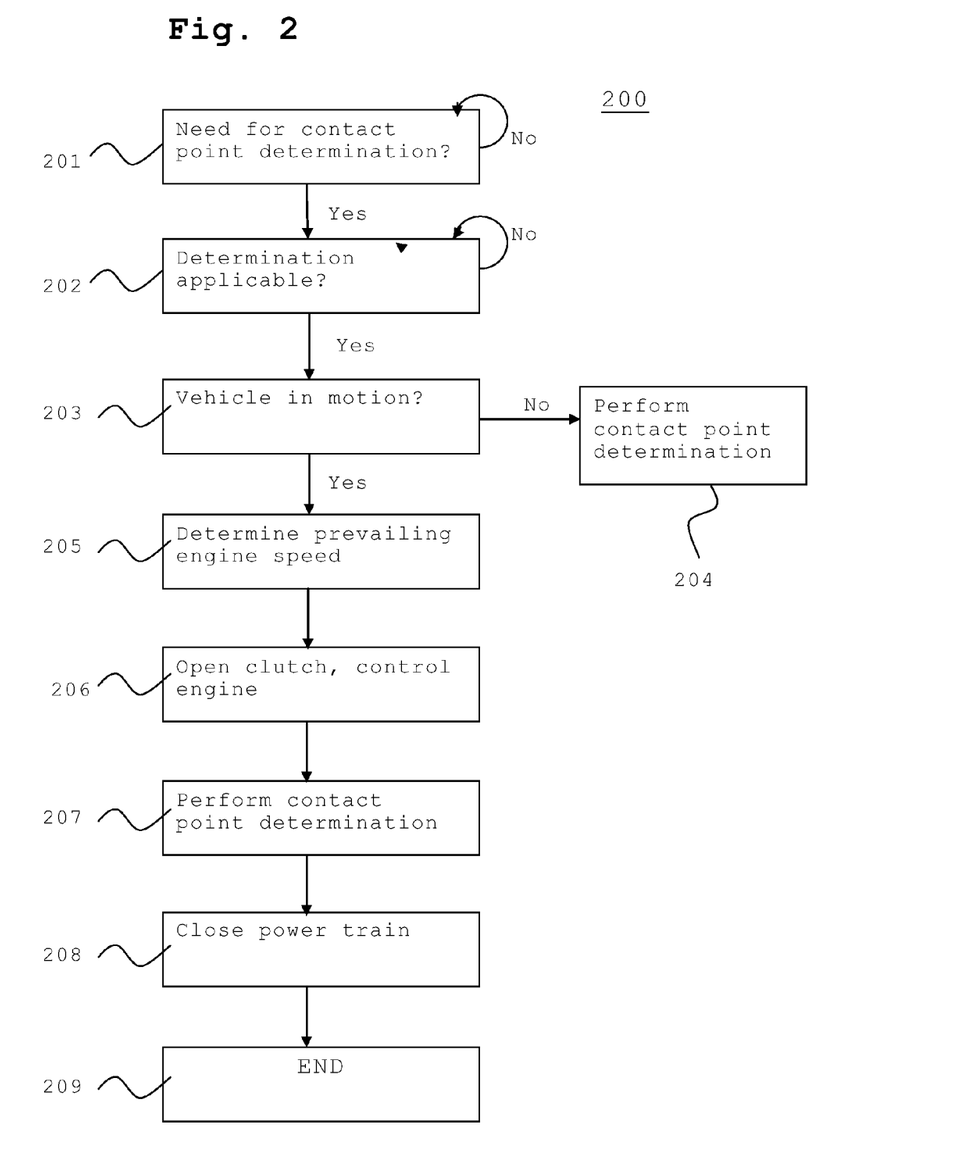
FIG. 2 depicts a method according to the present invention.

A method 200 according to the present invention is illustrated in FIG. 2. The method according to the invention begins at step 201 by ascertaining whether contact point determination is to be done. When such is not the case, the method stays at step 201, but if contact point determination is to be done, the method moves on to step 202. Moving on from step 201 to step 202 may be triggered in various different ways. For example, the time which has passed since it was previously done may be used to determine that contact point determination is needed. According to another example, the need is determined according to the method described in the parallel Swedish patent application SE 1150217-6 entitled "Method and system for determination of a need for contact point adaptation", which has the same applicant, inventor and filing date as the present application and bases need for contact point determination on the temperature of the clutch 106. This Swedish patent application corresponds to co-pending U.S. application Ser. No. 14/001,771, with the same filing date as the present application. The method described in that application comprises determining a first temperature of the clutch and comparing it with a second temperature determined previously. There is deemed to be need for contact point determination when the first temperature differs from the second by more than a first value.

The need for contact point determination and hence for moving on from step 201 to step 202 in FIG. 2 may of course also be determined in other suitable ways.

The method further comprises determining at step 202 whether contact point determination is applicable, i.e. whether the vehicle's current running behaviour is such that contact point determination is applicable. The method may stay at step 202 until it is determined that the way the vehicle is running makes it appropriate to do contact point determination. For example, no contact point determination should be done when the vehicle is on a steep upgrade, a situation in which opening of the clutch has as far as possible to be avoided lest the vehicle lose driving power.

The condition at step 202 may be defined in various different ways. The condition might for example be that the torque imparted to the power train by the vehicle's engine may be not more than a first torque value, e.g. a certain number of newton meters or a certain percentage of the maximum torque deliverable by the engine. Alternatively, the condition might be that the acceleration/retardation to which the vehicle will be subject upon opening of the clutch does not differ from prevailing acceleration/retardation by more than a predefined value which may for example depend on the vehicle's current speed, cargo load etc. The values as above may for example be set so that the acceleration/retardation is small enough not to be particularly noticeable to the vehicle's driver or to disturb him/her.

If braking of the vehicle can be done by means of a second power source, e.g. a service brake, supplementary brake or electric motor, situated downstream of the gearbox, or if the vehicle can be propelled by means of an electric motor situated downstream of the gearbox, it is possible according to an embodiment for the torque imparted from a power source situated upstream of the clutch to be replaced, during contact point determination, by a power source situated downstream of the gearbox, provided that it has sufficient capacity.

If for example a combustion engine drags, i.e. imparts to the power train a braking torque, this torque may instead be imparted by, for example, a second power source situated downstream of the gearbox. This makes it possible in such a situation for the combustion engine to be completely disconnected without affecting the vehicle's speed at all. In this case it may first be determined whether the second power source is sufficient, i.e. if it can be expected to deliver enough torque to be able to replace the engine's torque. Alternatively, the second power source or a combination of power sources situated downstream of the gearbox may replace such a large proportion of the first power source's torque that an acceleration/retardation condition as above is fulfilled.

The second power source may for example be controlled by the control unit which controls the combustion engine 101. Alternatively, this second power source may be autonomous and automatically take over the imparting of torque, e.g. via a superordinate function such as a retarder which takes care of constant speed braking by means of a vehicle speed demanded from, for example, a cruise control function.

When contact point determination is applicable, the method moves on to step 203 to determine whether the vehicle 100 is in motion and the clutch 106 is closed.

One embodiment determines only whether the vehicle is in motion, since it may already be in a running situation in which there is no transfer of power between the engine 101 and the gearbox 103. Examples comprise situations of high vehicle speed in which the power train is disconnected instead of the engine dragging at a high engine speed. In certain cases this may be effective from the energy perspective. In such cases, contact point determination is thus done in a situation where the clutch 106 is already relieved of torque and no engine control is required.

If the vehicle 100 is in motion, the method moves on to step 204 for contact point determination to be done, e.g. in any of the ways described below. If the vehicle is not in motion but stationary, contact point determination in greater freedom is possible without disturbing the driver and may for example be done by any of the methods described below.

If however the vehicle 100 is in motion with the power train closed, the method moves on to step 205 for engine control during contact point determination according to the present invention. The present invention is thus applied in contact point determination when the vehicle is in motion, beginning when the power train is closed, i.e. when the clutch is closed and a gear is engaged in the gearbox.

As contact point determination according to the present invention is done when the vehicle 100 is in motion, it should as above be preferably done in a situation where the vehicle's running state is appropriate. Possible examples comprise situations where the engine is driving or braking the vehicle with a low torque.

At step 205, the prevailing engine speed is determined and the method moves on to step 206 where the clutch 106 opens, but if this happens when the vehicle is in motion with the driveline closed, the engine will drop to idling speed, which the driver might see as inexplicable and disturbing vehicle behaviour. According to the present invention, the engine speed is therefore controlled in such a way that the driver need not be aware of the clutch opening at all.

To disengage a gear in the gearbox, as when changing gear, the engine 101 is first controlled to zero torque in the driveline (so-called rampdown) so that no torque is transmitted via the gearbox 103. Opening of the clutch 106 then begins and the engine will normally begin to drop towards idling speed unless actively controlled towards some other speed. According to the present invention, engine speed control according to the invention preferably begins as soon as it is detected that the clutch has begun to open.

This is followed by continuously controlling the engine towards the speed determined at step 205, e.g. the speed it would be at if a gear was engaged.

Controlling the engine 101 in this way thus makes it possible for the clutch 106 to open without being noticed by the vehicle's driver, since the engine can be kept at the speed which it had when the opening of the clutch began. When the clutch has thus opened, the gearbox may be put into neutral position to prevent the vehicle from being affected by the contact point determination. Certain types of contact point determination also require that the gearbox be put into neutral position. At the same time as the engine is controlled towards the speed determined at step 205, i.e. the speed it would have been at if the power train was closed with a gear engaged, the contact point adaptation is then possible at step 207 and may be done in any suitable way.

The present invention thus affords the advantage that control of the engine 101 is applied in such a way that contact point determination may take place unnoticed or substantially unnoticed by the driver when the vehicle is in motion with the power train closed. He/she is thus not subject to unnecessary disturbance.

During opening of the clutch 106, the rotation speed may thus be controlled towards that prevailing just before the clutch opens. One embodiment determines instead a speed for said engine 101 which is an expected speed of it upon closing of the clutch after said contact point determination, to which end the speed of said engine during contact point determination is controlled towards said speed determined. This speed change may for example depend on the possibility of the vehicle being thought of as being accelerated or retarded during the time when the contact point determination is taking place. This speed determination may for example also take the form of a speed change due to a gear change, i.e. the engine speed may be simulated as if a gear change is taking place.

Alternatively, the expected speed change may be determined on the basis of data concerning the itinerary ahead of the vehicle 100, which may for example be obtained via a so-called look-ahead function, or for example navigation data, in which case the speed of the engine 101 during the contact point determination may be controlled so that it changes according to the expected speed change.

The expected speed change which the engine 101 would have undergone if no contact point determination had been done may also be estimated for each point in time during the contact point determination, e.g. as above, in which case the engine's speed during contact point determination may be controlled so that it changes according to said expected speed change.

The method according to the present invention may also be arranged to be applied when a cruise control function for automatic maintenance of the vehicle's speed is activated. In this case the vehicle's control system may find more points in time which are appropriate for doing contact point determination, since it can to a greater extent determine and calculate the speed which the vehicle will be at the next time. Here again, any available data concerning the itinerary ahead of the vehicle may be taken into account. In cases where the vehicle has a cruise control function resulting in maintenance of constant distance from a vehicle in front, contact point determination may for example also be done when it is detected that the vehicle is about to catch up on a slower vehicle, in which case the contact point determination may be done during reduction of speed to that of the vehicle in front.

The contact point determination at step 207 may be done in any suitable way. In prior art this is normally done when the gearbox input shaft is stationary by moving the clutch 106 from open position to closed position, making it possible to determine the position at which the input shaft begins to accelerate. The contact point is for example determined as the position at which a rotation speed sensor on the gearbox input shaft registers a vehicle speed.

However, the time required for the adaptation according to this method may be too long for it to take place unnoticed when the vehicle is in motion. This is partly because on many occasions it takes a long time for the gearbox input shaft to come to a halt after the gearbox has been put into neutral position, particularly if the gearbox has warmed up (which normally means that there is little friction). In certain vehicles this process may be expedited by the usually present countershaft normally connected to said input shaft being possibly provided with a brake. However, many vehicles lack this facility.

It may also be difficult, depending on type of speed sensor, to correctly detect low rotation speeds of the input shaft and hence the actual contact point. What is established instead is the point (position) which the clutch 106 is at when the input shaft has reached a speed detectable by the sensor.

Contact point adaptation may for example also be done according to the solution described in Swedish patent application SE 0950663-5, which makes it possible for contact point adaptation to be done in a shorter time and hence on more occasions while the vehicle is in motion, e.g. during gear changes and during braking to a halt.

SE 0950663-5 uses the fact that the torque $M_{Clutch}$ transmitted by the clutch may be estimated as $M_{Clutch}=J\omega+M_{Friction}$, in which J is the moment of inertia of the first gearbox element (which may be known or be eliminated from the calculations as described in said patent application). Calculating $M_{Clutch}$ involves estimating the angular acceleration $\dot{\omega}$ and $M_{Friction}$ (the friction moment which acts upon the gearbox input shaft (the first gearbox element)).

The gearbox input shaft, with the gearbox put into neutral, is accelerated to desired speed, e.g. by means of the engine output shaft, via the clutch 106, followed by estimation of the friction coefficient for inherent friction of the first gearbox element (e.g. the gearbox input shaft including the clutch disc, or the gearbox input shaft and the countershaft).

From open position, the clutch 106 is then closed, whereupon the torque transmitted by it as above is a function of the estimated friction moment, and upon closing of the clutch the torque transmitted by it is determined for a plurality of its positions. The contact point is determined as the position of the clutch where the torque transferred by it exceeds a first value, e.g. zero, i.e. $M_{Clutch}>0$.

According to the present invention, the first gearbox element may take the form of any set of components which can be put into rotation by means of the clutch and be disconnected both from the vehicle's engine and from its powered wheels as above, i.e. a portion of the power train which can be disconnected both from the engine 101 and from the powered wheels 113, 114. The friction moment estimated as above is thus the friction moment for the combination of components.

Alternatively, the contact point determination may of course be done in some other suitable way.

When contact point determination has been done at step 207, a suitable gear (e.g. that in which the vehicle was at the time of opening the clutch, or that to which a gear change has been simulated as above) is engaged and torque transfer from the engine is again imparted to the power train while at the same time the clutch closes, step 208. The method then ends at step 209 or reverts to step 201 to determine whether the clutch's contact point is likely to have again changed in such a way as to require another contact point adaptation.

Further embodiments of the device according to the invention are referred to in the attached claims. It should also be noted that the device may be modified according to various embodiments of the method according to the invention (and vice versa) and that the present invention is in no way restricted to the embodiments described above of the method or the device according to the invention, but relates to and comprises all embodiments within the protective scope of the attached independent claims.

The invention claimed is:

1. A method for determination of a contact point for a clutch of a vehicle, such that said clutch is configured to be closed to transmit driving power between a first power source in the form of an engine and at least one powered wheel of said vehicle, said first power source being operable at various speeds including an idling speed thereof; said vehicle being engaged in a gear when said determination is started;

the method comprising:
  opening said closed clutch, and disengaging a gear in which said vehicle is operating and when said vehicle is in motion and said contact point is being determined;
  controlling a speed of said first power source towards a first speed ($\omega 1$) which is higher than said idling speed of said first power source, then determining said contact point; and
  after said contact point has been determined, closing said clutch and engaging said gear in which said vehicle was operating at a time of said opening of said clutch.

2. A method according to claim 1, further comprising placing said vehicle in motion and closing said clutch when said contact point determination begins.

3. A method according to claim 1, further comprising:
  when said vehicle is in motion and travelling at said first engine speed ($\omega 1$) which is higher than said idling speed of said vehicle, controlling said engine speed towards said first speed ($\omega 1$) during said contact point determination.

4. A method according to claim 1, wherein said first speed is an estimated speed of said first power source at a time of a closure of said clutch after said contact point determination.

5. A method according to claim 1, further comprising:
  determining an expected speed change for said first power source which is substantially a speed change which said first power source would exhibit if no contact point determination was done by controlling said first power source during said contact point determination so that said speed of said first power source changes according to said expected speed change.

6. A method according to claim 1, further comprising:
  determining an expected speed change for said first power source on the basis of data concerning an itinerary ahead of said vehicle, such that during said contact point determination, controlling said first power source so that said speed of said first power source changes according to said expected speed change.

7. A method according to claim 1, wherein said first power source is upstream of said clutch and said vehicle further comprises a second power source situated downstream of said clutch, and upon opening of said clutch, at least partly replacing torque imparted to said at least one powered wheel from said first power source by said second power source.

8. A method according to claim 7, wherein said second power source comprises an electric motor, a service brake or a supplementary brake of said vehicle.

9. A method according to claim 1, wherein when said contact point determination begins, a maximum torque imparted by said first power source is at most not greater than a first torque value.

10. A method according to claim 1, further comprising when said contact point is being determined, acceleration or retardation to which said vehicle is subjected upon said opening of said clutch does not deviate from a prevailing acceleration or retardation by more than a second value.

11. A method according to claim 1, wherein a cruise control function for automatic vehicle speed maintenance is activated.

12. A method according to claim 1, further comprising:
  at a first time, determining a first temperature of said clutch;
  comparing said determined first temperature determined of said clutch with a second temperature determined at a second time which precedes said first time; and applying said method when said first temperature differs from said second temperature by more than a first value.

13. A system for determining a contact point for a clutch of a vehicle, wherein said clutch is configured to transmit driving power between a first power source in the form of an engine and at least one powered wheel of the vehicle;
- a controller for opening of said clutch during determination of said contact point; and
- when said contact point is being determined and said vehicle is in motion, a second controller configured for controlling the speed of said first power source towards a first speed ($\omega 1$) which is higher than an idling speed of said first power source; and
- after the contact point has been determined, a device for engaging a gear in which the vehicle was at the time of opening of the clutch.

14. A vehicle provided with a system according to claim 13.

* * * * *